(12) United States Patent
Liu et al.

(10) Patent No.: US 8,497,707 B2
(45) Date of Patent: Jul. 30, 2013

(54) TRANSMITTER EQUALIZATION METHOD AND CIRCUIT USING UNIT-SIZE AND FRACTIONAL-SIZE SUBDRIVERS IN OUTPUT DRIVER FOR HIGH-SPEED SERIAL INTERFACE

(75) Inventors: Xin Liu, El Dorado Hills, CA (US); Arvind Bomdica, Fremont, CA (US)

(73) Assignee: Advanced Micro Devices, Inc., Cupertino, CA (US)

( * ) Notice: Subject to any disclaimer, the term of this patent is extended or adjusted under 35 U.S.C. 154(b) by 0 days.

(21) Appl. No.: 13/227,356

(22) Filed: Sep. 7, 2011

(65) Prior Publication Data

US 2013/0058429 A1     Mar. 7, 2013

(51) Int. Cl.
*H03K 19/094*     (2006.01)
(52) U.S. Cl.
USPC ............................................. 326/87; 326/93
(58) Field of Classification Search
USPC .......................................... 326/83–87, 93–98
See application file for complete search history.

(56) References Cited

U.S. PATENT DOCUMENTS

| | | | | |
|---|---|---|---|---|
| 7,109,744 | B1 * | 9/2006 | Shumarayev et al. | 326/30 |
| 7,256,720 | B2 * | 8/2007 | Fukuda | 341/143 |
| 7,659,763 | B2 * | 2/2010 | Camara et al. | 327/292 |
| 7,817,727 | B2 * | 10/2010 | Kumar et al. | 375/258 |
| 7,848,402 | B1 * | 12/2010 | Wang et al. | 375/232 |
| 8,030,968 | B1 * | 10/2011 | Avner et al. | 326/85 |
| 2007/0285120 | A1 * | 12/2007 | Venditti et al. | 326/30 |
| 2008/0034378 | A1 * | 2/2008 | Kumar et al. | 719/321 |

* cited by examiner

*Primary Examiner* — Don Le
(74) *Attorney, Agent, or Firm* — Williams, Morgan & Amerson, P.C.

(57) ABSTRACT

A method is provided for controlling a data transmission device that includes at least one fractional-sized subdriver. The method includes enabling at least one subdriver and driving a differential signal pair output. Also provided is a device with an output driver having a plurality of subdrivers where at least one subdriver is fractional-sized. The device also includes a de-emphasis portion configured to enable and disable the subdrivers. The device is configured to drive an output data signal. Also provided is a computer readable storage device encoded with data for adapting a manufacturing facility to create an apparatus such as the device. Also provided is an apparatus that includes an output driver with at least one fractional-sized subdriver and a de-emphasis portion configured to enable and disable the subdrivers of the output driver. The output driver is configured to drive a differential output data signal.

22 Claims, 9 Drawing Sheets

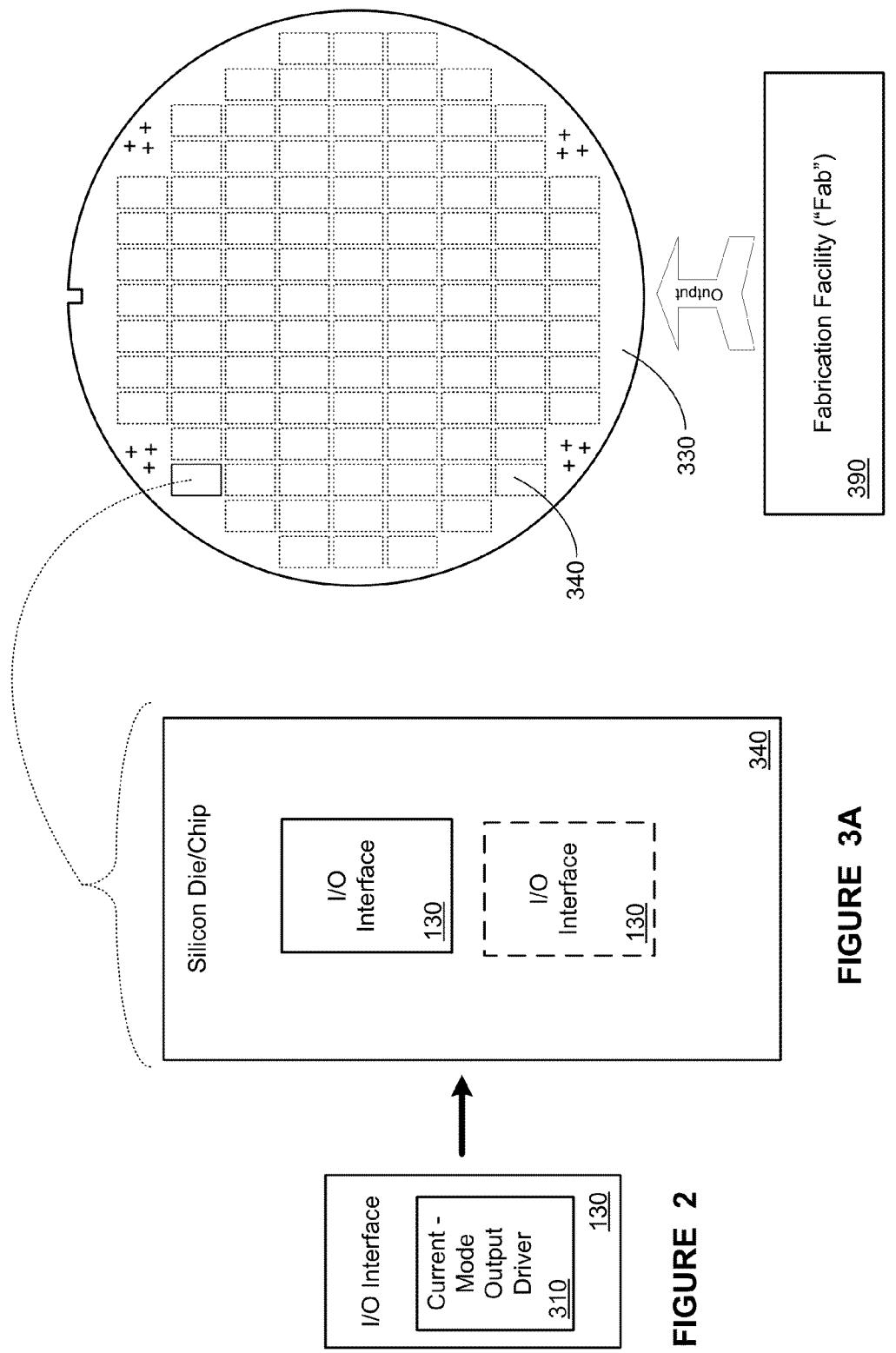

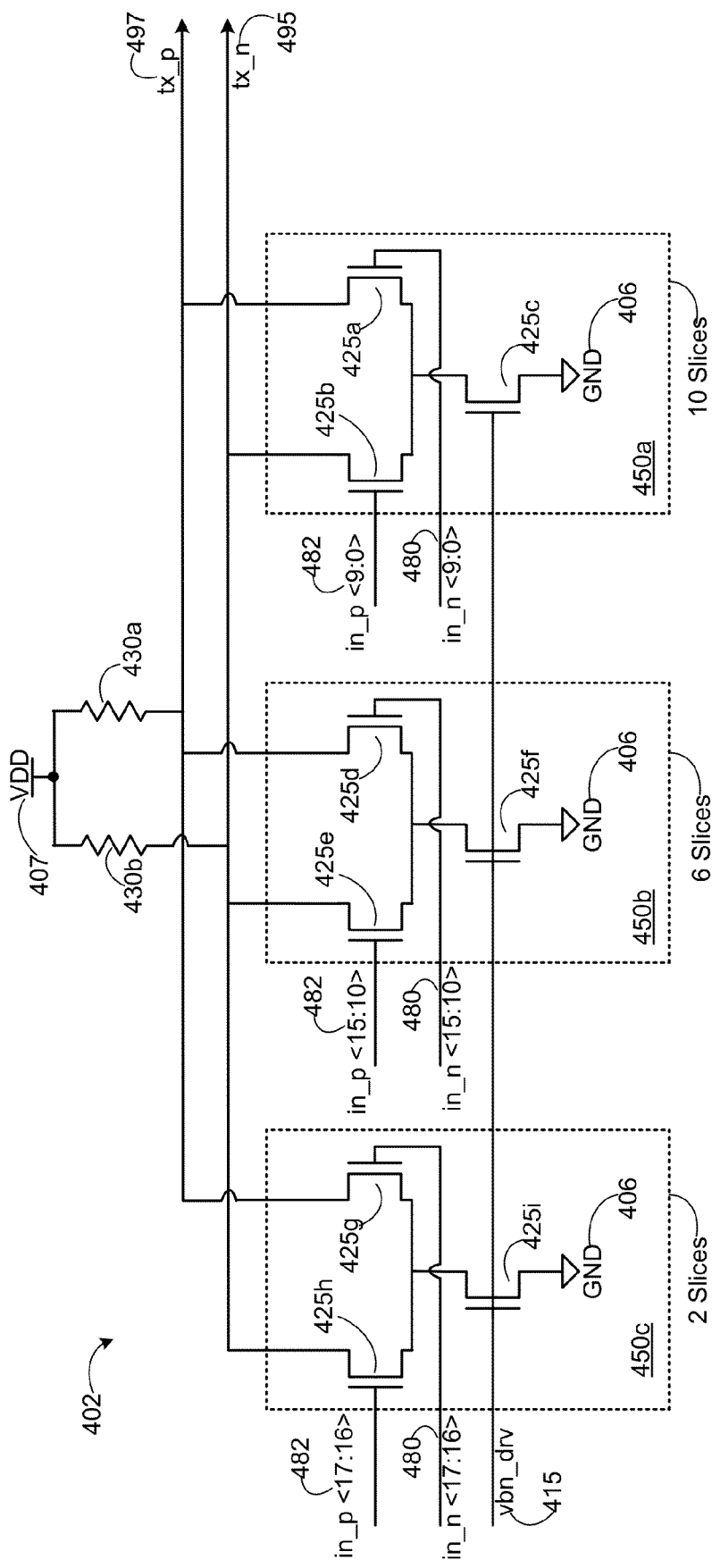
FIGURE 4 – Prior Art

TRANSMITTER EQUALIZATION METHOD AND CIRCUIT USING UNIT-SIZE AND FRACTIONAL-SIZE SUBDRIVERS IN OUTPUT DRIVER FOR HIGH-SPEED SERIAL INTERFACE

BACKGROUND

1. Field of the Invention

Embodiments of this application relate generally to electrical circuits and input/output ("I/O") interfaces, and, more particularly, to a method and circuit for transmitter equalization using unit- and fractional-sized subdrivers for high-speed serial interfaces.

2. Description of Related Art

Electrical circuits and data storage devices have evolved becoming faster and transmitting greater amounts of data. With the increased speed and bandwidth capabilities of electrical circuits and data storage devices, I/O interfaces must be adapted to be compatible with new system and technology requirements. As technologies for electrical and semiconductor circuits, communications and data storage devices have progressed, there has developed a greater need for reliability and stability, particularly in the area of I/O interfaces. However, voltage, current and signal transmission considerations introduce substantial barriers to controlling output amplitude for I/O interfaces. Issues such as attenuation and integrity for differential signals are particularly problematic.

Typically, in modern implementations for I/O interfaces, current-mode logic ("CML") drivers use large numbers of parallel instances of identical unit-sized subdrivers (also called slices or drivelets) in an attempt to compensate for channel loss and signal integrity problems. However, using multiple instances of identical unit-sized subdrivers to mitigate channel loss and integrity issues is inadequate to provide required performance and yield, especially at process, voltage and temperature ("PVT") corners. That is, variations in I/O interfaces and CML circuits due to PVT corners cause low yield and inadequate performance using state of the art solutions. Additionally, this approach requires large numbers of unit-sized subdriver slices, and this causes power dissipation issues, routing issues and excessive wiring capacitance. Excessive wiring capacitance causes reductions in driver bandwidth and difficulties in meeting transmission protocol requirements such as rise and fall times for data signals.

Embodiments presented herein eliminate or alleviate the problems inherent in the state of the art described above.

SUMMARY OF EMBODIMENTS

In one aspect of the present invention, a method is provided for controlling a data transmission device, where the data transmission device comprises an output driver circuit with a plurality of subdrivers. The method includes enabling at least one subdriver of the plurality of subdrivers, where the plurality of subdrivers comprises at least one fractional-sized subdriver and driving a differential signal pair output from the output driver circuit.

In another aspect of the invention, a device is provided. The device includes an output driver portion having a plurality of subdrivers, where at least one subdriver of the plurality of subdrivers is a fractional-sized subdriver. The device also includes a de-emphasis portion communicatively coupled to the data output driver portion, where the de-emphasis portion is configured to enable and disable a subset of the plurality of subdrivers. The device is configured to drive an output data signal.

In yet another aspect of the invention, a computer readable storage device encoded with data that, when implemented in a manufacturing facility, adapts the manufacturing facility to create an apparatus is provided. The includes an output driver portion having a plurality of subdrivers, where at least one subdriver of the plurality of subdrivers is a fractional-sized subdriver. The device also includes a de-emphasis portion communicatively coupled to the data output driver portion, where the de-emphasis portion is configured to enable and disable a subset of the plurality of subdrivers. The device is configured to drive an output data signal.

In yet another aspect of the invention, an apparatus is provided. The apparatus includes an output driver portion having a plurality of subdrivers, where at least one subdriver of the plurality of subdrivers is a fractional-sized subdriver, the output driver portion being configured to drive a differential output data signal. The apparatus also includes a de-emphasis portion communicatively coupled to the data output driver portion, where the de-emphasis portion is configured to enable and disable a subset of the plurality of subdrivers, and where the subset of the plurality of subdrivers comprises at least one fractional-sized subdriver.

BRIEF DESCRIPTION OF THE DRAWINGS

The embodiments of the instant application may be understood by reference to the following description taken in conjunction with the accompanying drawings, in which the leftmost significant digit(s) in the reference numerals denote(s) the first figure in which the respective reference numerals appear, and in which:

FIG. 2 shows a simplified block diagram of an I/O interface, according to one exemplary embodiment;

FIG. 3A shows a simplified block diagram of an I/O interface on a silicon chip, according to one exemplary embodiment;

FIG. 3B illustrates an exemplary detailed representation of an I/O interface produced in a semiconductor fabrication facility, according to one exemplary embodiment;

FIG. 4 illustrates a prior art schematic diagram of a CML output driver;

Figure 1:
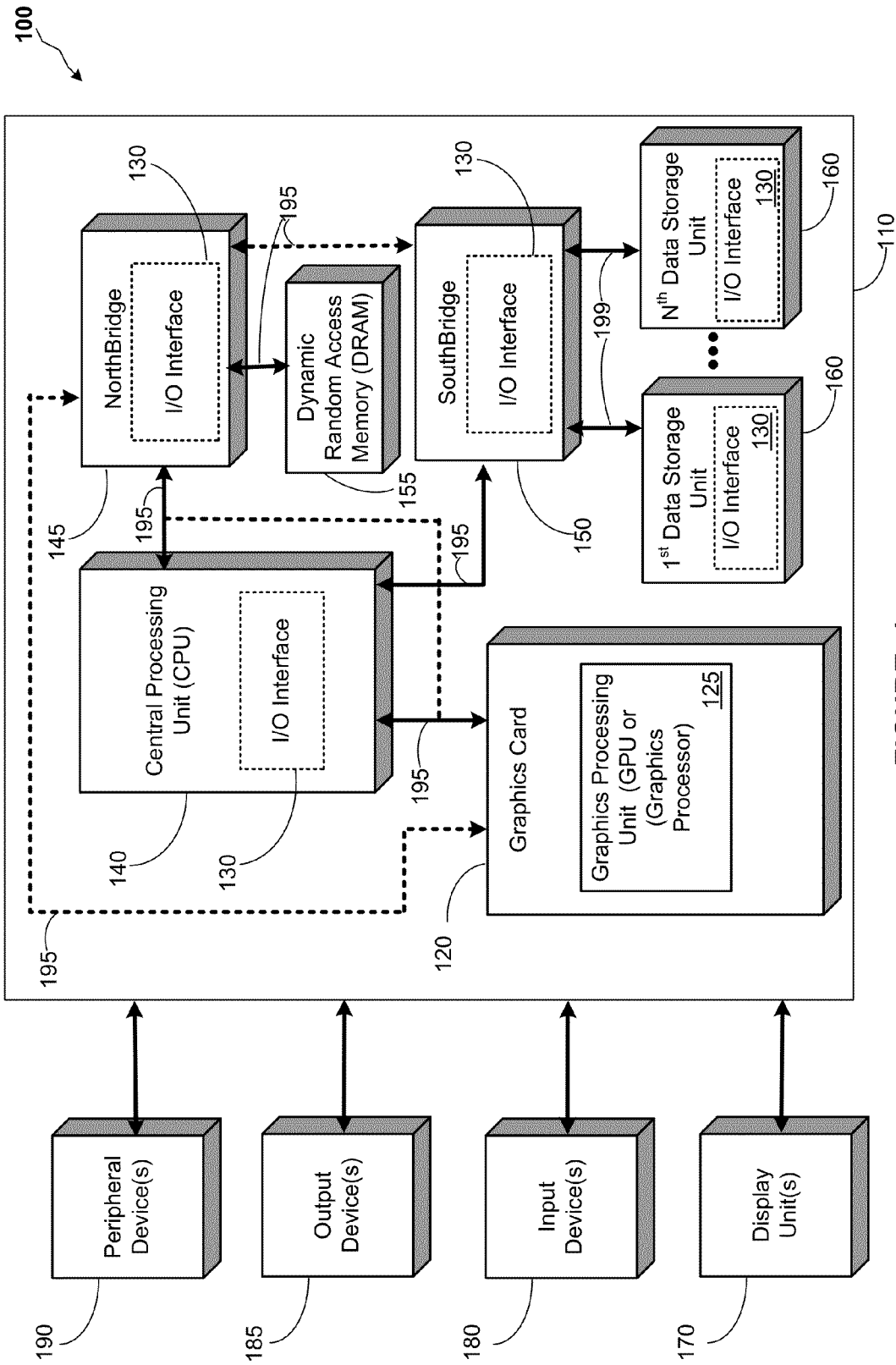
FIG. 1 schematically illustrates a simplified block diagram of a computer system including one or more input/output ("I/O") interfaces, according to one embodiment.

While the embodiments of the instant application are susceptible to various modifications and alternative forms, specific embodiments thereof have been shown by way of example in the drawings and are herein described in detail. It should be understood, however, that the description herein of specific embodiments is not intended to limit the embodiments to the particular forms disclosed, but, on the contrary, the intention is to cover all modifications, equivalents, and alternatives falling within the scope of the invention as defined by the appended claims.

DETAILED DESCRIPTION

Illustrative embodiments of the application are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present application will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present application. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the suffixes "_", "_b" and "_n" (or "'b" and "n") denote a signal that is active-low (i.e., the signal is activated or enabled when a logical '0' is applied to the signal). Signals not having these suffixes may be active-high (i.e., the signal is activated or enabled when a logical '1' is applied to the signal). While various embodiments and Figures herein are described in terms active-high and active-low signals, it is noted that such descriptions are for illustrative purposes of various embodiments and that alternate configurations are contemplated in other embodiments not explicitly described in this disclosure.

For discussion purposes, it is assumed that a digital signal 0 may approximately equal 0V (i.e., a ground node GND) and a digital signal 1 may approximately equal a power voltage node VDD. In alternate embodiments it is contemplated that values other than ground node and a power voltage node may be used for digital signals 0 and 1 respectively.

As used herein, the terms "substantially" and "approximately" may mean within 85%, 90%, 95%, 98% and/or 99%. In some cases, as would be understood by a person of ordinary skill in the art, the terms "substantially" and "approximately" may indicate that differences, while perceptible, may be negligent or be small enough to be ignored. Additionally, the term "approximately," when used in the context of one value being approximately equal to another, may mean that the values are "about" equal to each other. For example, when measured, the values may be close enough to be determined as equal by one of ordinary skill in the art.

As used herein, the terms "data transmission device" may be a current-mode output driver, a voltage- or current-mode pre-driver, an I/O interface, a central processing unit ("CPU"), a southbridge, a northbridge, a graphics processor unit ("GPU"), some combination thereof and/or the like, as would be understood by a person of ordinary skill in the art having the benefit of this disclosure.

As shown in the Figures and as described below, the circuits described herein may comprise various circuit components such as, but not limited to, metal oxide semiconductor field effect transistors ("MOSFETs"), resistors, capacitors, power node(s) and ground node(s). The MOSFETs may be n-type (nFET) or p-type (pFET), as would be known to a person of ordinary skill in the art. Similarly, the power nodes may be of an implementation specific and/or variable voltage level, as would be known to a person of ordinary skill in the art. In one or more embodiments, the nFETs and/or pFETs described herein may operate as switches. For example, the nFETs and/or pFETs may operate to complete circuit paths to allow the flow of current, and/or to drive signals. It is also contemplated that other forms of switches may be used in the embodiments described herein without departing from the scope of such embodiments, as would be apparent to a person of ordinary skill in the art having the benefit of this disclosure.

Embodiments of the present application generally provide for transmitter equalization using unit- and fractional-sized sub-drivers for high-speed serial interfaces. It is contemplated that various embodiments described herein are not mutually exclusive. That is, the various embodiments described herein may be implemented simultaneously with, or independently of, each other, as would be apparent to one of ordinary skill in the art having the benefit of this disclosure. Various embodiments herein may be described in terms of serial advanced technology attachment ("SATA") I/O interfaces. However, it should be noted that such descriptions are used in order to provide a basis for illustration and understanding of the embodiments presented herein. That is, the embodiments provided in this disclosure are not limited to SATA, but rather may be applied to other I/O interfaces as would be apparent to one of ordinary skill in the art having the benefit of this disclosure. Additionally, while the embodiments provided in this disclosure are described in the context of a CML output driver, the concepts presented herein are not limited as such. Other driver types such as, but not limited to, low voltage differential signal type drivers (LVDS-type drivers), voltage-mode output drivers, and/or the like, may also benefit from implementations consistent with the illustrated embodiments.

High speed I/O interfaces, such as SATA, require their associated interfaces to meet differential output signal parameters for different generations of the technologies (e.g., Gen1, Gen2, Gen3, etc.). In SATA, supply voltages may be as low as 1.0V, or lower. The generations of SATA must also meet strict differential peak-to-peak voltage parameters. For example, the differential peak-to-peak voltage may need to be as high as 1.0V. At submicron technologies requiring such parameters, variations (PVT corners) and/or the channel modulation effect can prevent operability and decrease yield. Therefore, it is difficult to tightly control currents and output voltages and simultaneously meet different parameter requirements.

High speed I/O and/or serial interfaces, such as SATA Gen3, transfer data at up to 6 Gb/sec. Because the interconnect channel has limited bandwidth, when the transmitter transmits data at such high speeds, signal attenuation due to channel loss will cause signal integrity issues when the data arrives at the receiver side after passing through the channel. For example, the received data will have narrower eye width and smaller eye height or even a closed eye. As such, the data may not be properly received at the receiver. The longer the channel, the more the channel loss occurs. Transmitters may use feed-forward equalizers to compensate for channel loss and improve signal integrity.

Additional information on related I/O interfaces may be found in "Method and Circuit for Precisely Controlling Amplitude of Current-Mode Logic Output Driver for High-Speed Serial Interface," by Xin Liu, et al., filed Sep. 6, 2011, as a separate application and incorporated herein by reference in its entirety, and "Low-Power Wide-Tuning Range Common-Mode Driver for Serial Interface Transmitters," by Xin Liu, et al., filed concurrently as a separate application and incorporated herein by reference in its entirety.

The embodiments described herein show a novel design that efficiently solves and/or mitigates the problems of the current state of the art. The embodiments described herein may show a multi-tap feed-forward equalization transmitter that may include a CML driver circuit to provide for transmitter equalization using unit- and fractional-sized sub-drivers. The embodiments described herein may allow for tunable output transmissions while simultaneously meeting strict voltage and transmission protocol requirements.

Turning now to FIG. 1, a block diagram of an exemplary computer system 100, in accordance with an embodiment of the present application, is illustrated. In various embodiments the computer system 100 may be a personal computer, a laptop computer, a handheld computer, a tablet computer, a mobile device, a telephone, a personal data assistant ("PDA"), a server, a mainframe, a work terminal, or the like. The computer system includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be a Radeon™ graphics card from Advanced Micro Devices ("AMD") or any other graphics card using memory, in alternate embodiments. The graphics card 120 may, in different embodiments, be connected on a Peripheral Component Interconnect "(PCI") Bus (not shown), PCI-Express Bus (not shown) an Accelerated Graphics Port ("AGP") Bus (also not shown), or any other connection known in the art. It should be noted that embodiments of the present application are not limited by the connectivity of the graphics card 120 to the main computer structure 110. In one embodiment, computer runs an operating system such as Linux, Unix, Windows, Mac OS, or the like.

In one embodiment, the graphics card 120 may contain a graphics processing unit (GPU) 125 used in processing graphics data. The GPU 125, in one embodiment, may include one or more embedded memories (not shown). In one embodiment, the embedded memory(ies) may be an embedded random access memory ("RAM"), an embedded static random access memory ("SRAM"), or an embedded dynamic random access memory ("DRAM"). In one or more embodiments, the embedded memory(ies) may be an embedded RAM (e.g., an SRAM). In alternate embodiments, the embedded memory(ies) may be embedded in the graphics card 120 in addition to, or instead of, being embedded in the GPU 125. In various embodiments the graphics card 120 may be referred to as a circuit board or a printed circuit board or a daughter card or the like.

In one embodiment, the computer system 100 includes a central processing unit ("CPU") 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, CPU 140, northbridge 145, GPU 125 may be included in a single package or as part of a single die or "chips" (not shown). Alternative embodiments which alter the arrangement of various components illustrated as forming part of main structure 110 are also contemplated. The CPU 140 and/or the northbridge 145, in certain embodiments, may each include one or more I/O interfaces 130. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present application. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In one embodiment, the southbridge 150 may have one or more I/O interfaces 130, in addition to any other I/O interfaces 130 elsewhere in the computer system 100. In various embodiments, the southbridge 150 may be connected to one or more data storage units 160 using a data connection or bus 199. The data storage units 160 may be hard drives, solid state drives, magnetic tape, or any other writable media used for storing data. In one embodiment, one or more of the data storage units may be SATA data storage units and the data connection 199 may be a SATA bus/connection. Additionally, the data storage units 160 may contain one or more I/O interfaces 130. In various embodiments, the central processing unit 140, northbridge 145, southbridge 150, graphics processing unit 125, DRAM 155 and/or embedded RAM may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present application. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to corresponding physical digital media, a universal serial buss ("USB") device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present application as would be understood by one of skill in the art.

In one embodiment, any number of computer systems 100 may be communicatively coupled and/or connected to each other through a network infrastructure. In various embodiments, such connections may be wired or wireless without limiting the scope of the embodiments described herein. The network may be a local area network (LAN), wide area network (WAN), personal network, company intranet or company network, the Internet, or the like. In one embodiment, the computer systems 100 connected to the network via the network infrastructure may be a personal computer, a laptop computer, a handheld computer, a tablet computer, a mobile device, a telephone, a personal data assistant (PDA), a server, a mainframe, a work terminal, any other computing device described herein, and/or the like. The number of computers connected to the network may vary; in practice any number of computer systems 100 may be coupled/connected using the network.

In one embodiment, computer systems 100 may include one or more graphics cards. The graphics cards 120 may contain a graphics processing unit (GPU) 125 used in processing graphics data. The GPU 125, in one embodiment, may include a memory structure 130. In one embodiment, the memory structure 130 may be an embedded static random access memory (SRAM). In one or more embodiments, the memory structure 130 may include embedded ECC logic. In alternate embodiments, the memory structure 130 may be embedded in the graphics card 120 in addition to, or instead of, being embedded in the GPU 125. In another embodiment, the graphics card 120 may include a non-embedded memory, for example a dynamic RAM (DRAM) in addition to any memory structures 130. The graphics card 120 may also include one or more display interfaces. To the extent certain exemplary aspects of the graphics card 120 are not described herein, such exemplary aspects may or may not be included in various embodiments without limiting the spirit and scope of the embodiments of the present application as would be understood by one of skill in the art. In one embodiment, the graphics processing unit 125 and memory structure 130 may reside on the same silicon chip as the CPU 140 and the northbridge 145. In one alternate embodiment, the graphics processing unit 125 and memory structure 130 may reside on the same silicon chip as the CPU 140. In such embodiments, the silicon chip(s) may be used in a computer system 100 in place of, or in addition to, the graphics card 120. The silicon chip(s) may be housed on the motherboard (not shown) or other structure of the computer system 100.

Turning now to FIG. 2, a simplified, exemplary representation of the I/O interface 130, and, according to one or more embodiments, a current-mode output driver 310, which may be used in silicon die/chips 340, as well as devices depicted in FIG. 1, according to various embodiments, is illustrated. However, those skilled in the art will appreciate that the I/O interface 130 may take on any of a variety of forms, including those previously described above, without departing from the spirit and scope of the instant application. The I/O interface 130 may be implemented as single elements (130) or in groups of logic (not shown).

Turning to FIG. 3A, the silicon die/chip 340 is illustrated as one or more the I/O interfaces 130, or any other configuration of the I/O interface as would be apparent to one of skill in the art having the benefit of this disclosure. As discussed above, various embodiments of the I/O interface 130 may be used in a wide variety of electronic devices, including, but not limited to, southbridge devices, central processing units, northbridge devices, motherboards, graphics cards, combinatorial logic implementations, stand-alone controllers, other integrated circuits (ICs), or the like.

Turning now to FIG. 3B, in accordance with one embodiment, and as described above, one or more of the I/O interfaces 130 may be included on the silicon die/chips 340 (or computer chip). The silicon die/chips 340 may contain one or more different configurations of the I/O interfaces 130 (e.g., I/O interfaces 130 configured to perform according to one or more connection standards, such as SATA). The silicon chips 340 may be produced on a silicon wafer 330 in a fabrication facility (or "fab") 390. That is, the silicon wafers 330 and the silicon die/chips 340 may be referred to as the output, or product of, the fab 390. The silicon die/chips 340 may be used in electronic devices, such as those described above in this disclosure.

Turning now to FIG. 4, a schematic diagram of an exemplary prior art implementation of a portion of a CML output driver is depicted. The prior art implementation depicted uses an output driver 402. The output driver 402 may include one or more subdriver (i.e., drivelets or slices) groups 450. As shown, output driver 402 contains eighteen subdriver slices. In the depicted prior art implementation, three subdriver groups 450a-c are used. The subdriver group 450a may contain ten subdriver slices, the subdriver group 450b may contain six subdriver slices, and the subdriver group 450c may contain two subdriver slices. The subdriver groups 450a-c may together provide for the total output drive current of the output driver 402 (and thus for the CML output driver). The subdriver groups 450a-c may include nFETs 425a-c, 425d-f and 425g-i respectively as shown. The nFETs 425a, 425d and 425g may have their drains connected to an output tx_p 497 and to a first connection of a resistor 430a, and the nFETs 425b, 425e and 425h may have their drains connected to an output tx_n 495 and to a first connection of a resistor 430b. The second connections of the resistors 430a-b may be connected to the power voltage node VDD 407 as shown. The resistors 430a-b may be calibrated to about 50Ω. The nFETs 425a-b, 425d-e and 425g-h may have their respective sources connected together and connected to the drains of nFETs 425c, 425f and 425i respectively as shown. The nFETs 425c, 425f and 425i may each have their respective sources connected to the ground node GND 406 and have their respective gates connected to a drive enable vbn_drv 415. The gates of the nFETs 425a, 425d and 425g may be connected to an input signal in_n 480, and the gates of the nFETs 425b, 425e and 425h may be connected to an input signal in_p 482. The nFETs of the subdriver groups 450a-c may receive a number of bits from each of the input signals in_p 482 and in_n 480 that is equal to the number of slices of each of the subdriver groups 450a-c, as depicted in FIG. 4. For example, as shown, subdriver group 450a has ten slices, so subdriver group 450a may receive ten bits of in_p 482 (in_p<9:0>) and ten bits of in_n 480 (in_n<9:0>).

The prior art implementation shown in FIG. 4 uses the subdriver groups 450a-c to achieve different levels of de-emphasis for serial data transmission (e.g., differential data transmission). As shown, the prior art implementation may use the subdriver groups 450a-c in different combinations to achieve different levels of de-emphasis; the subdriver groups 450a-c include a total eighteen slices of subdriver. However, because the prior art implementation only uses unit-sized subdrivers, many slices of the unit-sized subdrivers are needed in order to achieve a relatively low resolution or granularity of de-emphasis. In other words, because the subdrivers shown are all of the same size, their respective combinations used for driving output data signals are not able to achieve sufficient de-emphasis granularity to account for PVT corners, varying transmission lengths and media, and transmission loss. Additionally, a larger number of slices has the undesired effect of larger wiring capacitance that will reduce the output driver bandwidth, cause more power consumption, degrade transmitter return loss performance, complicate circuit routing and make the layout less compact.

Figure 5A:
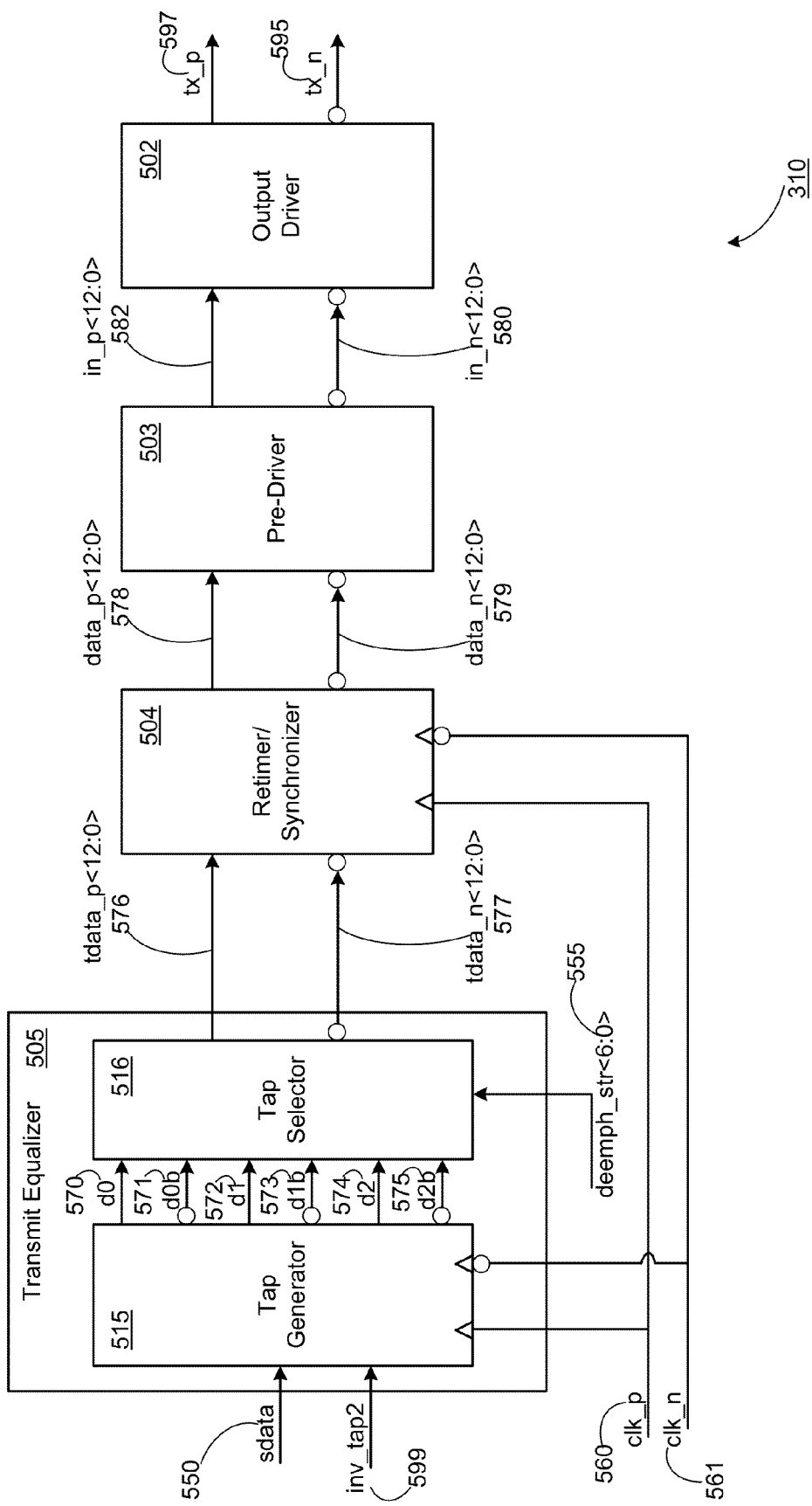
FIG. 5A illustrates a schematic diagram of a portion an I/O interface, according to one exemplary embodiment.

Turning now to FIG. 5A, a diagram of an exemplary implementation of a portion of the I/O interface 130 is illustrated, according to one embodiment. As previously described, in one or more embodiments, the I/O interface 130 may contain a current-mode output driver 310. As shown in FIG. 5A, the current-mode output driver 310 may be implemented in one or more portions (e.g., a transmit equalizer 505 portion, a retimer 504 portion, a pre-driver 503 and/or an output driver 502 portion that may function as a data output driver), or may be implemented as one logical block. It should be noted that in various embodiments shown in the Figures and described herein, the current-mode output driver 310 may be implemented in a transmit equalizer 505 portion, a retimer 504 portion, a pre-driver 503 and/or an output driver 502 portion for purposes of illustration and conceptualization, however any configuration and/or partitioning of the current-mode output driver 310 may be used in accordance with the embodiments herein.

The transmit equalizer 505 may receive as inputs the clock signals clk_p 560 and clk_n 561. In one embodiment, the clk_n 561 may be an inverted clk_p 560 signal. The transmit equalizer may also receive a serialized data signal sdata 550, a de-emphasis strength signal deemph_str 555 and a tap2 invert select signal inv_tap2 599 configured to invert the tap2 signals. In one embodiment, the sdata 550 may be a high-speed serial data signal composed of "1's" and "0's" (ones and zeros). The transmit equalizer 505 may comprise a tap generator 515 (described in further detail below with respect to FIG. 5B) and a tap selector 516 (described in further detail below with respect to FIG. 5C). The sdata 550, the clk_p 560, the clk_n 561 and the inv_tap2 599 may be received as inputs by the tap generator 515. The tap generator 515 my output signals d0 570, d0b 571, d1 572, d1b 573, d2 574 and d2b 575 to the tap selector 516. In one embodiment, the d0b 571, d1b 573 and d2b 575 signals may be transmitted using inverted outputs. The tap selector 516 may also receive the deemph_str 555 signal as an input. In one embodiment, the deemph_str 555 may comprise one or more bits (e.g., the deemph_str 555 may be a 7-bit signal). The tap selector 516 may output tap data signals tdata_p 576 and tdata_n 577 from the transmit equalizer 505 to the retimer/synchronizer (retimer) 504. In one embodiment, the tdata_n 577 may be transmitted by the tap selector 516 using an inverted output, and may be received using an inverted input at the retimer 504. In one embodiment, the tdata_p 576 and the tdata_n 577 may comprise one or more bits for each slice of subdriver (i.e., each instance of subdriver/drivelet) in the output driver 502. For purposes of discussion and illustration, and in accordance with one embodiment, the output driver 502 may have thirteen (13) subdriver slices (as shown below with respect to FIG. 6). As such, in one embodiment, the tdata_p 576 and the tdata_n 577 may comprise thirteen bits.

The retimer 504 may also receive the clk_p 560 and the clk_n 561 as inputs. In one embodiment, the retimer/synchronizer 504 may be configured to retime or synchronize the tap data signals tdata_p 576 and tdata_n 577. That is, the outputs of the tap selector 516 may not all be aligned to a clock edge, and the retimer 504 may align the outputs of the tap selector 516 such that the outputs all align with a clock edge. The retimer 504 may output the aligned data signals data_p 578 and data_n 579. In one embodiment, the data_n 579 may be transmitted using an inverted output and may be received using an inverted input at the pre-driver 503. In one embodiment, the data_p 578 and the data_n 579 may comprise one or more bits for each slice of subdriver (i.e., each instance of subdriver/drivelet) in the output driver 502. The pre-driver 503 may comprise circuitry, as is known in the art or otherwise, configured to act as a driving circuit supplemental to the output driver 502. The pre-driver 503 may output the data signals in_p 582 and in_n 580 to the output driver 502. In one embodiment, the in_n 580 may be transmitted using an inverted output and may be received using an inverted input at the output driver 502. In one embodiment, the in_p 582 and the in_n 580 may comprise one or more bits for each slice of subdriver (i.e., each instance of subdriver/drivelet) in the output driver 502. The output driver 502 (described in further detail below with respect to FIG. 6) may output data signals tx_p 597 and tx_n 595. In one embodiment, the tx_n 595 may be transmitted using an inverted output as shown.

Figure 5B:
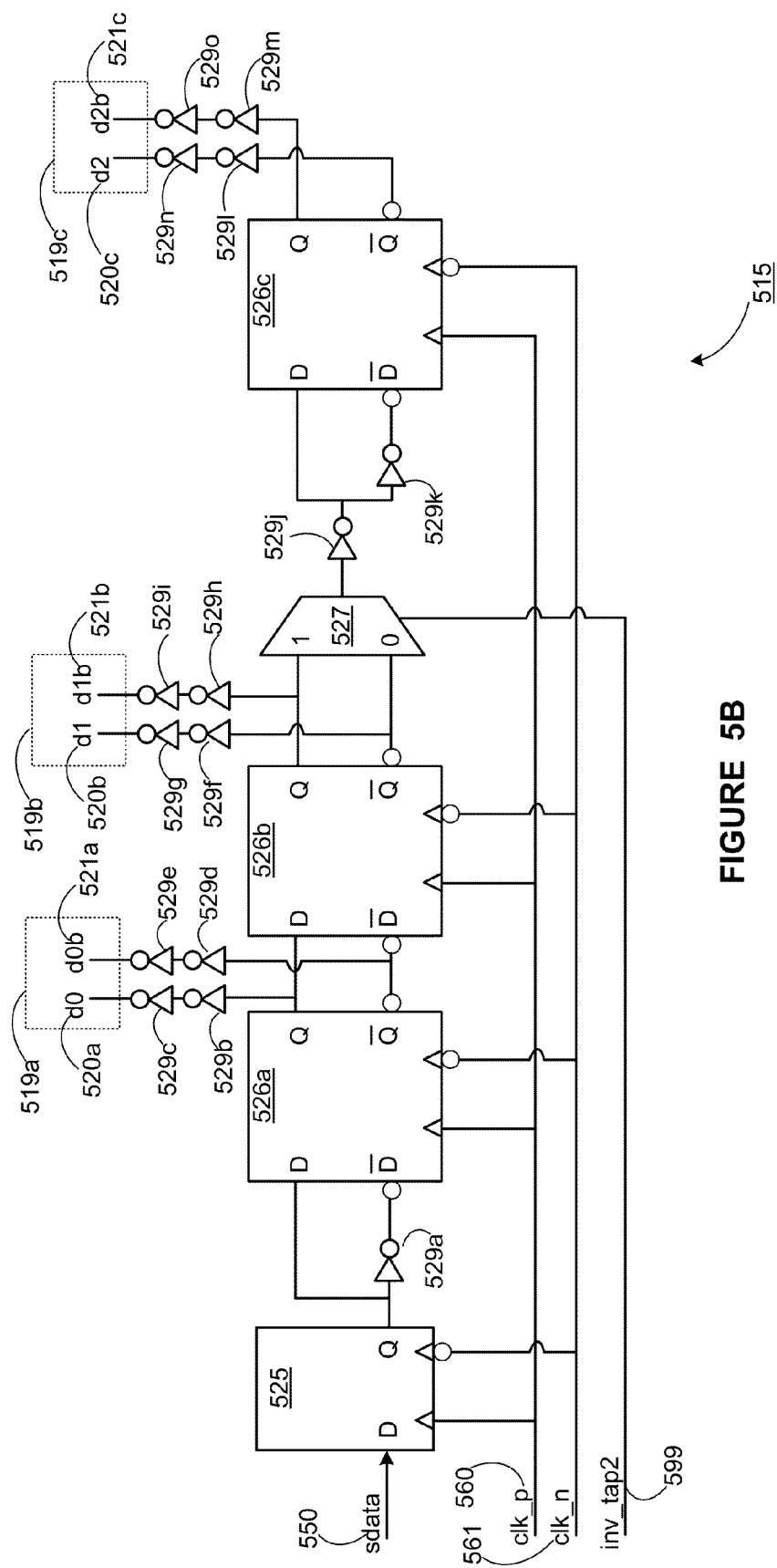
FIG. 5B illustrates a schematic diagram of a portion of an I/O interface, according to one exemplary embodiment.

Turning now to FIG. 5B, a diagram of an exemplary implementation of a portion of the I/O interface 130 is illustrated, according to one embodiment. As previously described, in one or more embodiments, the I/O interface 130 may contain a current-mode output driver 310. As shown in FIG. 5B, the current-mode output driver 310 may comprise a tap generator 515. In one embodiment, the tap generator 515 may comprise a single-input register 525 and three dual-input registers 526a-c. The registers 525 and 526a-c may be flip-flops or other equivalent circuit elements. The registers 525 and 526a-c may have the clk_p 560 and the clk_n 561 as clock inputs. The tap generator 515 may also comprise a multiplexor mux 527 and a plurality of inverters 529a-o. The mux 527 may receive the inv_tap2 as its selector input. In one embodiment the tap generator 515 may comprise one or more taps 519a-n (e.g., the three taps: tap0 519a, tap1 519b and tap2 519c, as shown in FIG. 5B). In one embodiment, each tap 519a-c in the tap generator 515 may be configured to generate a group of tap signals 520a-n and 521a-n respectively. The signals 521a-n may be inverted signals 520a-n respectively. As shown in FIG. 5B, the tap 519a may comprise tap signals d0 520a and d0b 521a, the tap 519b may comprise tap signals d1 520b and d1b 521b and the tap 519c may comprise tap signals d2 520c and d2b 521c.

The register 525 may receive the sdata 550 as an input, and may output a clocked version of the sdata 550 and an inverted clocked version (via the inverter 529a) of the sdata 550 to the D input and the D_inputs respectively of the register 526a as shown. The clocked outputs Q and Q_ of the register 526a may be the signals of the tap0 519a. The signal d0 may be connected to the Q_ output of the register 526a via the inverters 529b-c, and the signal d0b may be connected to the Q_ output of the register 526a via the inverters 529d-e. The clocked outputs Q and Q_ of the register 526a may be transmitted to the inputs D and D_ respectively of the register

526b. The clocked outputs Q and Q_ of the register 526b may be the signals of the tap1 519b. The signal d1 may be connected to the Q_ output of the register 526b via the inverters 529f-g, and the signal d1b may be connected to the Q output of the register 526b via the inverters 529h-i.

The clocked outputs Q and Q_ of the register 526b may be connected to the inputs (1 and 0 respectively) of the mux 527 as shown. The output of the mux 527 may be connected to the input of the inverter 529j. The output of the inverter 529j may be connected to the D input of the register 526c and may be connected to D_ input of the register 526c via the inverter 529k as shown. The clocked outputs Q and Q_ of the register 526c may be the signals of the tap2 519c. The signal d2 574 may be connected to the Q_ output of the register 526c via the inverters 529l and 529n, and the signal d2b 575 may be connected to the Q output of the register 526c via the inverters 529m and 529o.

The taps 519a-c (tap0, tap1 and tap2), as depicted in the exemplary embodiment shown in FIG. 5B, may be configured such that the d0 570 and d0b 571 of the tap0 are the real-time data, the d1 572 and d1b 573 of the tap1 are inverted data delayed by one clock period (or one unit interval (UI)), and the d2 574 and d2b 575 of the tap2 are double-inverted data delayed by two clock periods (or two UIs). In one embodiment, the mux 527 may invert the d2 574 and the d2b 575 (i.e., the tap2 519c). In other words, in various embodiments, the tap2 519c may be a two UI delayed tap0 519a or may be a two UI delayed inverted tap0 519a. In the exemplary configuration shown, the tap0 signals d0 570 and d0b 571 will control the data output of the output driver 502 while the tap1 and tap2 signals d1 572, d1b 573, d2 574 and d2b 574 may be used in various combinations/configurations to control the amount of de-emphasis in the data output of the output driver 502 (explained in greater detail below with respect to FIG. 6).

Figure 5C:
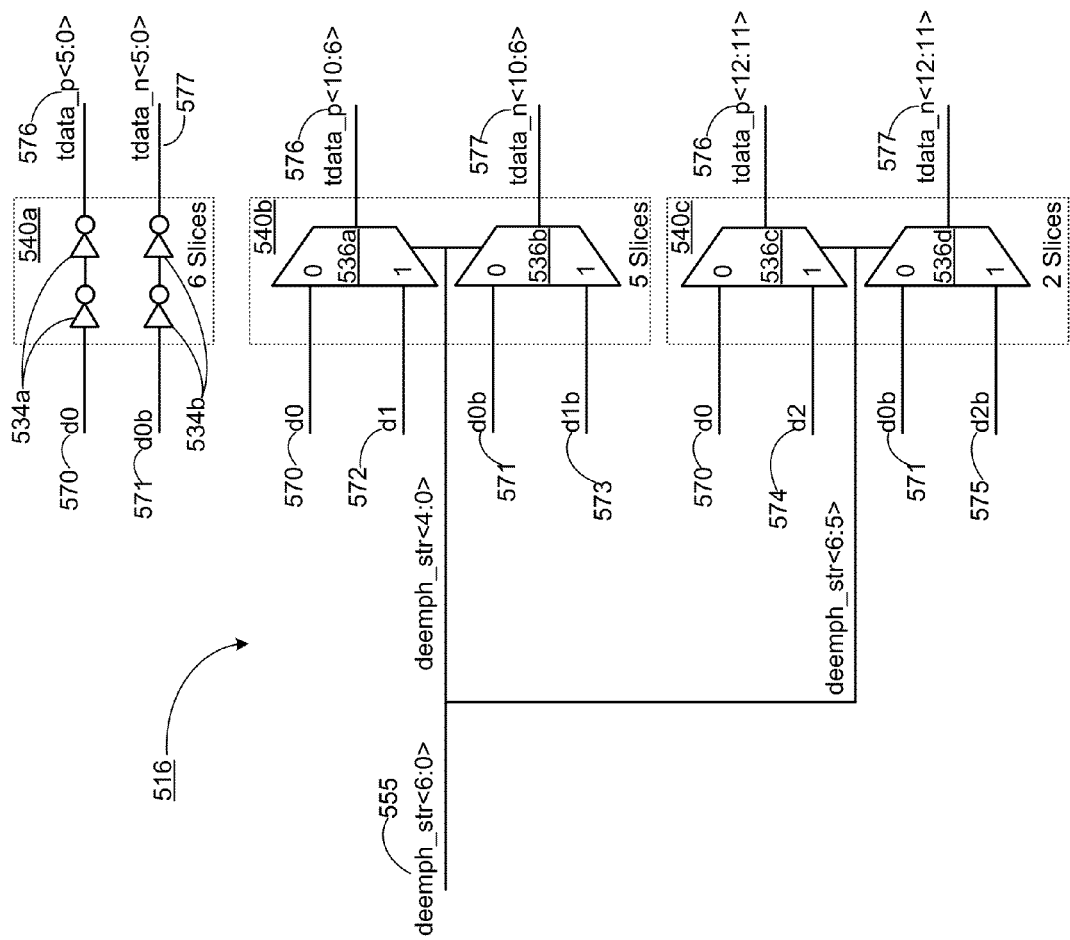
FIG. 5C illustrates a schematic diagram of a portion of an I/O interface, according to one exemplary embodiment.

Turning now to FIG. 5C, a diagram of an exemplary implementation of a portion of the I/O interface 130 is illustrated, according to one embodiment. As previously described, in one or more embodiments, the I/O interface 130 may contain a current-mode output driver 310. As shown in FIG. 5C, the current-mode output driver 310 may comprise a tap selector 516. In one embodiment, the tap selector 516 may comprise selector groups 540a-c. In on embodiment, the selector group 540a may comprise six selector slices, the selector group 540b may comprise five selector slices and the selector group 540c may comprise two selector slices.

In one embodiment, the d0 570 and the d0b 571 may be driven out by the selector group 540a of the tap selector 516 using inverter pairs 534a and 534b respectively. The selector group 540a may drive out signals as tdata_p 576 from the inverter pair 534a and as tdata_n 577 from the inverter pair 534b. In one embodiment, there may be six bits of the tdata_p 576 and the tdata_n 577 driven from the selector group 540a because the group selector 540a may comprise six selector slices. Each slice of the five slices of the selector group 540b may comprise a pair of multiplexors mux 536a and 536b. The mux 536a may have the d0 570 connected to its 0 input and d1 572 connected to its 1 input. The mux 536b may have the d0b 571 connected to its 0 input and d1b 573 connected to its 1 input. In one embodiment, five bits of the deemph_str 555 may be used to control the mux pairs 536a and 536b for each slice of the five slices of the selector group 540b. The muxes 536a for the five slices may output five bits of the tdata_p 576 (one bit for each slice) and the muxes 536b for the five slices may output five bits of the tdata_n 577 (one bit for each slice). Each slice of the two slices of the selector group 540c may comprise a pair of multiplexors mux 536c and 536d. The mux 536c may have the d0 570 connected to its 0 input and d2 574 connected to its 1 input. The mux 536d may have the d0b 571 connected to its 0 input and d2b 575 connected to its 1 input. In one embodiment, two bits of the deemph_str 555 may be used to control the mux pairs 536c and 536d for each slice of the two slices of the selector group 540c. The muxes 536c for the two slices may output two bits of the tdata_p 576 (one bit for each slice) and the muxes 536b for the two slices may output two bits of the tdata_n 577 (one bit for each slice).

It should be noted that if the deemph_str 555 is equal to the binary value "000 0000b" (i.e., all bits of the deemph_str 555 signal are zeros) then there will be no de-emphasis contribution to the data output of the output driver 502 because all the muxes 536a-d for all slices will output the d0 570 and the d0b 571. However, different values for the deemph_str 555 may allow for various de-emphasis settings to be applied, as shown in FIG. 5C and as described below with respect to Table 2.

Figure 6:
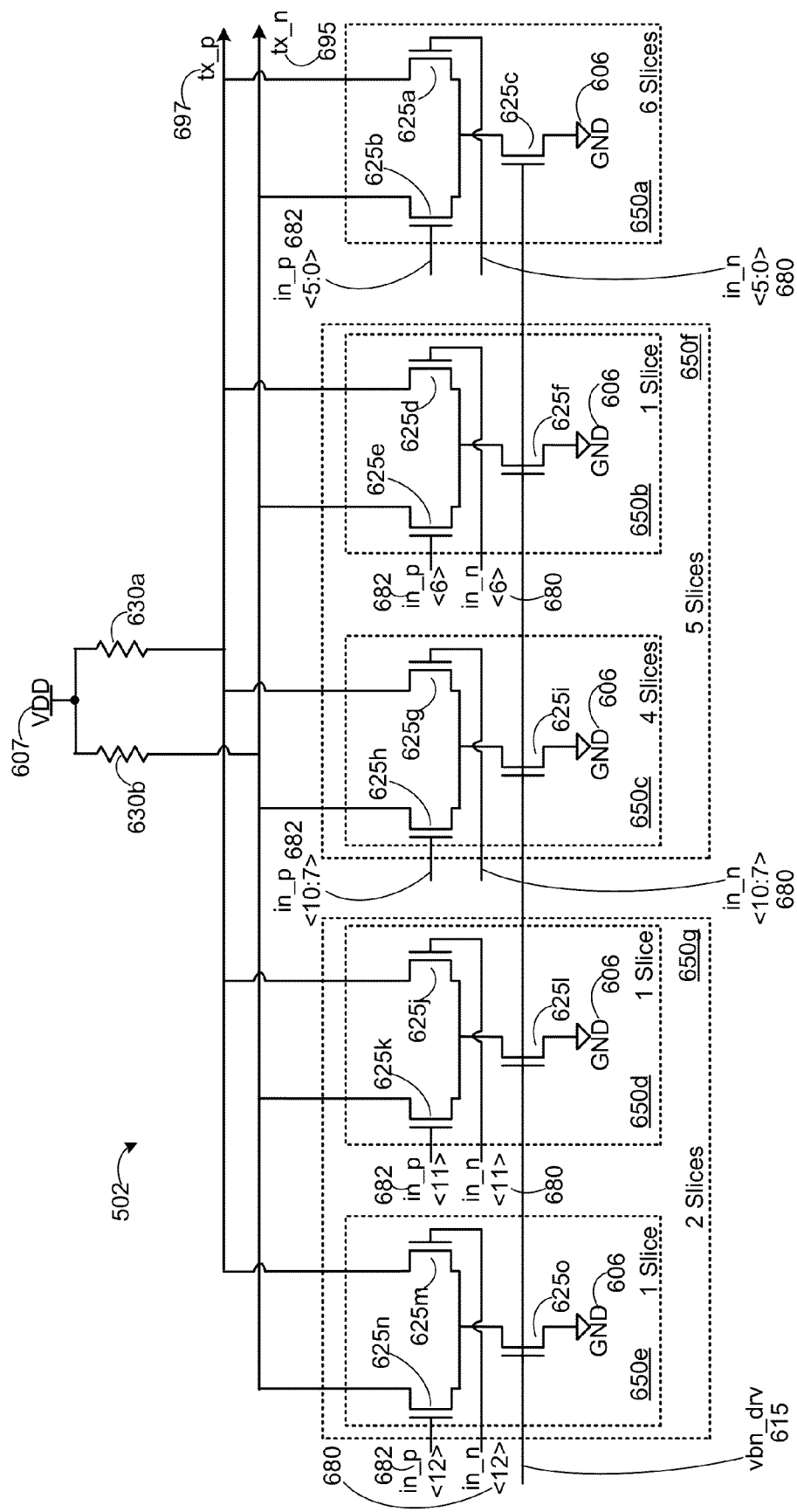
FIG. 6 illustrates a schematic diagram of a portion of an I/O interface, according to one exemplary embodiment.

Turning now to FIG. 6, a diagram of an exemplary implementation of a portion of the I/O interface 130 is illustrated, according to one embodiment. As previously described, in one or more embodiments, the I/O interface 130 may contain a current-mode output driver 310. As shown in FIG. 6, the current-mode output driver 310 may include an output driver 502 portion that may function as a data output driver. The current-mode output driver 310 may also include a power voltage node VDD 607 (i.e., a supply voltage for supplying operating voltage to one or more circuits) and a ground voltage node GND 606.

The output driver 602 may include one or more subdriver (i.e., drivelets or slices) groups 650. In one embodiment, five subdriver groups 650a-e may be used, where the subdriver groups 650b-c may be grouped as a subdriver group 650f, and where the subdriver groups 650d-e may be grouped as a subdriver group 650g. The subdriver group 650a may contain six subdriver slices, the subdriver group 650b may contain one subdriver slice, the subdriver group 650c may contain four subdriver slices, the subdriver group 650d may contain one subdriver slice, and the subdriver group 650e may contain one subdriver slice. As such, the subdriver group 650f may contain five subdriver slices, and the subdriver group 650g may contain two subdriver slices. The subdriver groups 650a-e (or 650a and 650f-g) may together provide for the total output drive current of the output driver 602 (and thus for the CML output driver). The subdriver groups 650a-e may include nFETs 625a-c, 625d-f, 625g-i, 625j-l and 625m-o respectively as shown. The nFETs 625a, 625d, 625g, 625j and 625m may have their drains connected to an output tx_p 697 and to a first connection of a resistor 630a, and the nFETs 625b, 625e, 625h, 625k and 625n may have their drains connected to an output tx_n 695 and to a first connection of a resistor 630b. The second connections of the resistors 630a-b may be connected to the power voltage node VDD 607 as shown. In one embodiment, the resistors 630a-b may be calibrated to about 50Ω. The nFETs 625a-b, 625d-e, 625g-h, 625j-k and 625m-n may have their respective sources connected together and connected to the drains of nFETs 625c, 625f, 625i, 625l and 625o respectively as shown. The nFETs 625c, 625f, 625i, 625l and 625o may each have their respective sources connected to the ground node GND 606 and have their respective gates connected to a drive enable vbn_dry 615. The gates of the nFETs 625a, 625d, 625g, 625j and 625m may be connected to an input signal in_n 680, and the gates of the nFETs 625b, 625e, 625h, 625k and 625n may be connected to an input signal in_p 682. The nFETs of the subdriver groups 650a-e may receive a number of bits from each of the input signals in_p 682 and in_n 680 that is equal to the number of slices of each of the subdriver groups 650a-e, as depicted in FIG. 6. For example, as shown, subdriver group 650a has six slices, so subdriver group 650a may receive six bits of in_p 682 (in_p<5:0>) and six bits of in_n 680 (in_n<5:0>).

As shown in FIG. 6, the output driver 502 uses the subdriver groups 650a-e to achieve different levels of de-emphasis for serial data transmission (e.g., differential data transmission). As shown in FIGS. 5A-5C and FIG. 6, the output driver 502 may use the subdriver groups 650a-e in different combinations to achieve different levels of de-emphasis. However, in contrast to the prior art implementation shown in FIG. 4, the output driver 502 as shown in FIG. 6 uses both unit-size and fractional-size subdrivers to achieve a greater equalization granularity for de-emphasis over a greater programmable range while using fewer slices of subdriver to accomplish this (e.g., 18 slices in the prior art implementation of FIG. 4 versus 13 slices in exemplary embodiments shown in FIGS. 5A-6). In one embodiment, the subdriver groups 650b and 650d may have half-sized subdriver slices (or another fractional-sized subdriver), while the remaining groups 650a, 650c and 650e may have unit-sized subdriver slices. That is, the subdrivers in the subdriver groups 650b and 650d may be half the size of (i.e., 0.5 times the size of) the subdrivers in the subdriver groups 650a, 650c and 650e. In one embodiment, the output driver 502 may have eleven slices of unit-sized subdriver and two slices of half-sized subdriver. This configuration may equate to an effective drive strength about equal to twelve unit-sized subdrivers.

In various embodiments, it is contemplated that other fractional values, such as, but not limited to, 0.25, 0.4, 0.6, 0.75, 0.8 and/or the like may be used for sizing the fractional-size subdrivers. In other words, a fractional-sized subdriver may be of a size that is not unit-sized. It is also contemplated in alternate embodiments that other numbers of unit-size and/or fractional-size subdrivers may be used in the output driver 502.

By using a combination of subdrivers with unit-size and fractional-size, their respective combinations may be used for driving output data signals that are able to achieve sufficient de-emphasis granularity to account for PVT corners, varying transmission lengths and media, and transmission loss while using a smaller number of slices than the prior art. Because a smaller number of slices are required by using unit- and fractional-size subdrivers, this has the effect of smaller wiring capacitance (improving output driver bandwidth), less power consumption, increases in transmitter return performance, simplification of circuit routing and more compact circuit layout. Furthermore, prior art control circuitry such as de-emphasis strength decoders and additional tap select circuitry (shown as tapsel2-tapsel0 in Table 1 below) can be eliminated by using, for example, the illustrated embodiment shown in FIG. 5C and accompanying description.

TABLE 2

TX Equalization Control When tap2 is not selected

| deemph_str<6:0> (Hex) | # of selected tap2 | # of selected tap1 | # of selected tap0 | De-emphasis (dB) |
| --- | --- | --- | --- | --- |
| 00 | 0 | 0 | 12 | 0 |
| 01 | 0 | 0.5 | 11.5 | −0.76 |
| 02 | 0 | 1 | 11 | −1.58 |
| 03 | 0 | 1.5 | 10.5 | −2.50 |
| 06 | 0 | 2 | 10 | −3.52 |
| 07 | 0 | 2.5 | 9.5 | −4.68 |
| 0E | 0 | 3 | 9 | −6.02 |
| 0F | 0 | 3.5 | 8.5 | −7.60 |
| 1E | 0 | 4 | 8 | −9.54 |
| 1F | 0 | 4.5 | 7.5 | −12.04 |

Turning now to Table 1 and Table 2, control settings and de-emphasis values are shown for the prior art implementation of FIG. 4 (Table 1) and for the exemplary CML driver 310 portion embodiments depicted in FIGS. 5A-6 (Table 2). The "De-emphasis" column of Table 1 shows the amount of de-emphasis achieved by the prior art (as in FIG. 4) over the first seven output driver 402 drive configurations using the prior art tap1 (i.e., configurations based on the possible tapsel1 signal combinations). As shown, the prior art allows for a de-emphasis range of 0 dB to −9.54 dB over seven steps of de-emphasis. The "De-emphasis" column of Table 2 shows the amount of de-emphasis achieved by the exemplary embodiments illustrated in FIGS. 5A-6 of the instant disclosure over the first ten output driver 502 drive configurations using the tap1 519b selector group 540b. As shown, the illustrated embodiment allows for a de-emphasis range of 0 dB to −12.04 dB over ten steps of de-emphasis. It should be noted that a greater amount of de-emphasis is possible by using the illustrated embodiment over the prior art. This may be due in part to the use of fractional-sized subdrivers, shown in Table 2 as 0.5 (half-sized) contributions. For example, when deemph_str<6:0> 555=07h, the value 9.5 under tap0 means that the tap0 519a will control nine slices of a unit-sized subdriver plus one slice of a fractional-sized subdriver (half-sized or 0.5). The value 2.5 under tap1 means that the tap1 519b will control two slices of a unit-sized subdriver plus one slice of a fractional-sized subdriver (half-sized or 0.5). The value 0 under tap2 means that the tap2 519c will not control any unit- or fractional-sized subdrivers. When the tap2 519c is disabled and/or not selected, the de-emphasis (in decibels) for one or more embodiments may be calculated as:

$$\text{De-emphasis} = 20 \cdot \log_{10}[(\text{tap0}-\text{tap1})/(\text{tap0}+\text{tap1})] \quad (1),$$

where tap0 is the tap0 519a and tap1 is the tap1 519b.

Additionally, a finer granularity of de-emphasis is also possible using the illustrated embodiment. That is, the illus-

TABLE 1

PRIOR ART: TX Equalization Control When tap2 is not selected

| deemph_str<4:0> (Hex) | tapsel2<1:0> (Binary) | tapsel1<5:0> (Binary) | tapsel0<9:0> (Binary) | # of selected tap2 | # of selected tap1 | # of selected tap0 | De-emphasis (dB) |
| --- | --- | --- | --- | --- | --- | --- | --- |
| 00 | 00 | 000000 | 0000000000 | 0 | 0 | 18 | 0 |
| 01 | 00 | 000001 | 0000000000 | 0 | 1 | 17 | −1.02 |
| 02 | 00 | 000011 | 0000000000 | 0 | 2 | 16 | −2.18 |
| 03 | 00 | 000111 | 0000000000 | 0 | 3 | 15 | −3.52 |
| 04 | 00 | 001111 | 0000000000 | 0 | 4 | 14 | −5.11 |
| 05 | 00 | 011111 | 0000000000 | 0 | 5 | 13 | −7.04 |
| 06 | 00 | 111111 | 0000000000 | 0 | 6 | 12 | −9.54 | trated embodiment allows for ten steps of de-emphasis while the prior art only allows for seven. As previously discussed, the illustrated embodiment also uses fewer slices of subdriver than the prior art and eliminates the need for some prior art control circuitry such as de-emphasis strength decoders and additional tap select circuitry (shown as tapsel2-tapsel0 in Table 1). When all three taps (tap0 519*a*, tap1 519*b* and tap2 519*c*) are selected/enabled (by setting the number of selected tap2 519*c* to 0.5, 1 or 1.5, by setting the number of selected tap1, and by setting the inv_tap2 599 to 0 or 1, transmitter equalization may have different effect on the signal integrity than otherwise when tap2 519*c* is not selected. It should be noted that while Table 2 shows transmitter equalization control with the tap2 519*c* not enabled/used, it is contemplated that additional de-emphasis granularity may be achieved by enabling/using the tap2 519*c*. It should also be noted that in each row (i.e., each de-emphasis configuration) of Table 2, the sum of tap2 519*c*, tap1 519*b* and tap0 519*a* is twelve (where twelve is the total number of equivalent unit-sized subdriver slices depicted in FIGS. 5A to 6).

Figure 7:
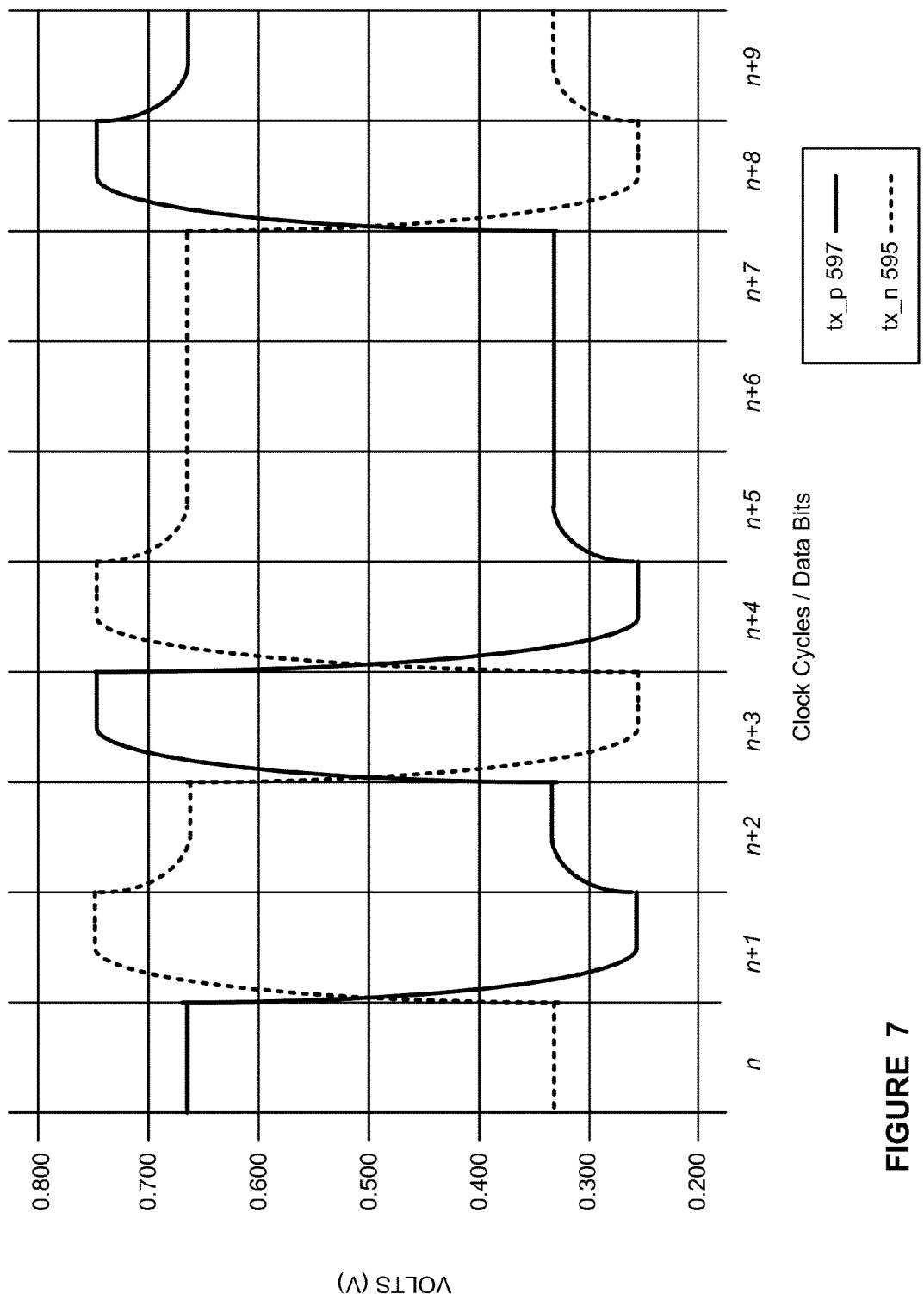
FIG. 7 illustrates a schematic diagram of a differential signal, according to one exemplary embodiment.

Turning now to FIG. 7, a diagram of an exemplary transmitter output waveform, such as that of the tx_p 597 and the tx_n 595, is illustrated, according to one embodiment. The exemplary illustrated waveform shows a transmitter output, according to one or more embodiments herein, with the tap0 519*a* and the tap1 519*b* enabled and the tap2 519*c* disabled. The illustrated waveform depicts a transmitter output with de-emphasis applied. The solid line depicts the tx_p 597, and the dotted line depicts the tx_n 595. The y-axis shows data signal volts (V) and the x-axis shows clock cycles and/or data bits. In one embodiment, one data bit may be transmitted per clock cycle, as shown in FIG. 7. As shown, the data bit stream depicted in FIG. 7 is: 1001000011.

High speed serial data transmission standards such as SATA, USB 3.0, PCI Express, HyperTransport and/or the like, may operate at such high data rates that the transmission medium upon which they are transmitted may not have sufficient bandwidth to accommodate the speed and voltage level of the data signals. This may be due to the physical composition of the medium, the width of the trace, the length of the trace, the number of vias in the trace, board connectors, and other issues that introduce extra capacitance on the transmission medium and/or the like. As such, the data eye at the receiver may be too small for the receiver to capture the data or may be closed. This issue may be particularly problematic when switching/transitioning the data signal from a "1" to a "0" in a pattern such as "11110111" or from a "0" to a "1" in a pattern such as "000010000". In one embodiment, a full swing may be used during a data signal switch/transition (e.g., from a "1" to a "0"). The full swing may allow for faster signal rise/fall times during timing critical transitions. The full swing may over-shoot the de-emphasis voltage level in some embodiments. In one embodiment, if the data signal remains the same (i.e., remains at "1" or at "0") after a full swing transition and does not transition again immediately, the transmission voltage level may be reduced or decreased to the de-emphasis voltage levels. If the data signal switches/transitions (e.g., from a "1" to a "0") immediately after a full swing transition (e.g., on the next clock cycle), another full swing transition may immediately follow the previous one as shown in the transition of the n+3 to n+4 clock cycle/data bits of FIG. 7. De-emphasis may also help to alleviate the aforementioned problems by allowing transmission and operation within voltage parameters that the transmission medium can accommodate. For example, a long trace may only be able to be equalized and/or compensated by a −3.5 dB de-emphasis (i.e., a 0.5V differential full swing with a 0.333V de-emphasized differential swing) as shown by the de-emphasis voltage levels in FIG. 7. If the data were constantly driven at the 0.5V full differential swing, data loss may occur.

As shown, the tx_p 597 and the tx_n 595 may be differential signals that may swing between about 0.75V and about 0.25V, in accordance with one embodiment. That is, the differential pair tx_p 597 and the tx_n 595 may have a full swing of about 0.5V and a common mode voltage ($V_{CM}$) of about 0.5V. The full swing of 0.5V may be accomplished by driving the tap0 519*a* signals d0 570 and d0*b* 571 and the tap1 519*b* signals d0 572 and d0*b* 573 at the same polarity or in the same direction. That is when the d1 570 is "1", the d1 572 will also be "1", and when the d0*b* 571 is "0", the d1*b* 573 will also be "0". Similarly, when the d0 570 is "0", the d1 572 will also be "0", and when the d0*b* 571 is "1", the d1*b* 573 will also be "1". The full swing of the tx_p 597 and the tx_n 595 may be conceptualized as the "(tap0+tap1)" of the de-emphasis equation (1) described above. In other words, when the tap0 519*a* signals d0 570 and d0*b* 571 and the tap1 519*b* signals d1 572 and d1*b* 573 are driven at the same polarity, the drive strength of these signals is added together.

In contrast, when the tap0 519*a* signals d0 570 and d0*b* 571 and the tap1 519*b* signals d1 572 and d1*b* 573 are driven at opposite polarities, the drive strength of the tap1 519*b* signals (d1 572 and d1*b* 573) are subtracted from the drive strength of the tap0 519*a* signals (d0 570 and d0*b* 571). The de-emphasis (i.e., the reduced swing or the de-emphasized signal portion) may be conceptualized as the "(tap0−tap1)" of the de-emphasis equation (1) described above. In this way, de-emphasis may be accomplished (in accordance with the embodiments described herein). The de-emphasis shown in FIG. 7 provides for driving the tx_p 597 and the tx_n 595 at about a 0.333V reduced swing after the 0.5V differential full swing transition. This may allow for an exemplary, illustrative de-emphasis of about −3.5 dB for the differential output. In one embodiment, the tx_p 597 and the tx_n 595 may continue to be driven at the de-emphasis voltage until the next full swing.

Figure 8B:
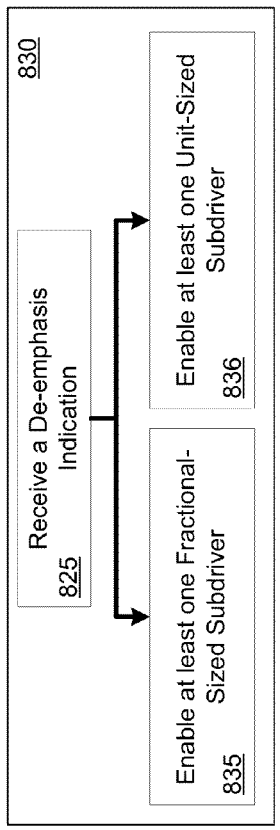
FIG. 8B illustrates a flowchart depicting a detailed representation of portions of FIG. 8A, according to one exemplary embodiment.
Figure 8C:
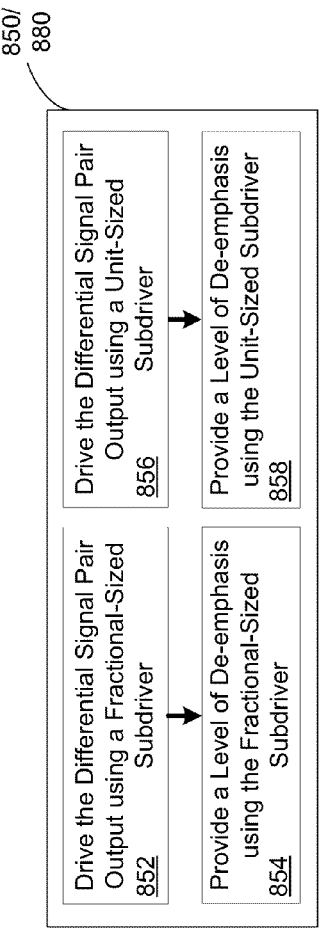
FIG. 8C illustrates a flowchart depicting a detailed representation of portions of FIG. 8A, according to one exemplary embodiment.
Figure 8E:
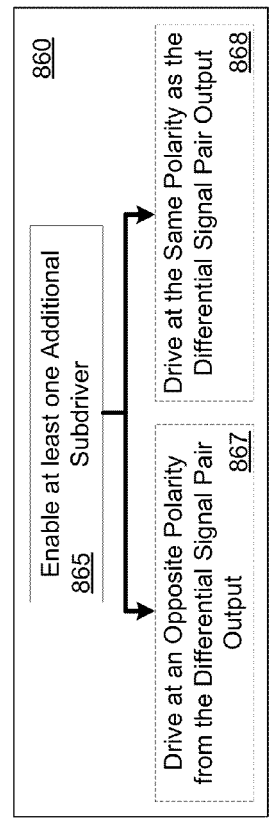
FIG. 8E illustrates a flowchart depicting a detailed representation of portions of FIG. 8A, according to one exemplary embodiment.
Figure 8A:
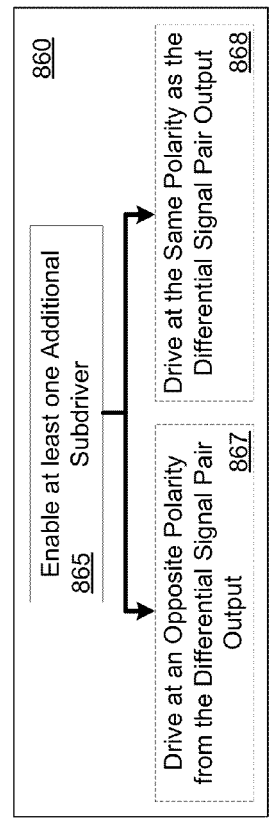
FIG. 8A illustrates a flowchart depicting operation of a transmission equalization circuit using fractional- and unit-sized subdrivers, according to one exemplary embodiment.

Turning now to FIG. 8A, a flowchart depicting operation of a circuit for transmitter equalization using unit- and fractional-size subdrivers is shown, in accordance with one or more embodiments. At 810, a differential signal pair output may be driven from a current-mode output driver. At 820 a level of de-emphasis may be indicated/provided by/to the output driver. At 830, a subdriver(s) may be enabled in response to the indication of de-emphasis in 820. In one embodiment, the subdriver that is enabled may be one or more unit-sized subdrivers, one or more fractional-sized subdrivers and/or a combination thereof. At 850, a differential data signal may be driven out on a differential pair output with a level of de-emphasis using the output driver circuit. In one embodiment, the de-emphasis may have an effect similar to that described above with respect to FIG. 7. It is noted that in various embodiments, the de-emphasis may be more than, less than, or about equal to the de-emphasis shown in FIG. 7. At 860, the level of de-emphasis may be adjusted/tuned/altered. In one embodiment, the level of de-emphasis may be increased or decreased. At 880, a differential data signal may be driven out on a differential pair output with the adjusted/tuned/altered de-emphasis using the output driver circuit.

Turning now to FIG. 8B, a flowchart depicting operation of a circuit for transmitter equalization using unit- and fractional-size subdrivers is shown, in accordance with one or more embodiments. FIG. 8B provides an exemplary detailed depiction of 830 from FIG. 8A. At 825, the de-emphasis indication may be received by the output driver. In one embodiment, the received indication may be the indication from 820. From 825, the flow may proceed to either 835 and/or 836. At 835, at least one fractional-sized subdriver may be enabled. At 836, at least one unit-sized subdriver may be enabled. In one embodiment, one or more unit-sized subdrivers and one or more fractional-sized subdrivers may be enabled. While 835 and 836 are shown as being in parallel, it is contemplated that 835 and 836 may occur at about the same time, or one may occur before or after the other.

Turning now to FIG. 8C, a flowchart depicting operation of a circuit for transmitter equalization using unit- and fractional-size subdrivers is shown, in accordance with one or more embodiments. FIG. 8C provides an exemplary detailed depiction of 850 and/or 880 from FIG. 8A. At 852, the differential signal pair output may be driven using one or more fractional-sized subdrivers. The one or more fractional-sized subdrivers may provide a level of de-emphasis to the differential output at 854. At 856, the differential signal pair output may be driven using one or more unit-sized subdrivers. The one or more unit-sized subdrivers may provide a level of de-emphasis to the differential output at 858. While 852/854 and 856/858 are shown as being in parallel, it is contemplated that 852/854 and 856/858 may occur at about the same time, or one may occur before or after the other. In some embodiments, the individual steps 852, 854, 856 and 858 may occur at approximately the same time or at different times with respect to each other.

Figure 8D:
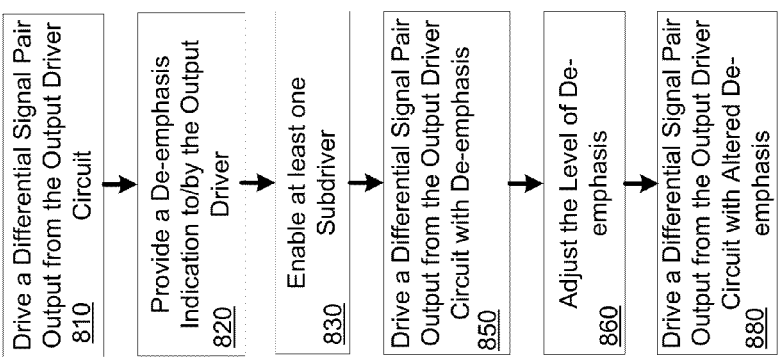
FIG. 8D illustrates a flowchart depicting a detailed representation of portions of FIG. 8C, according to one exemplary embodiment.

Turning now to FIG. 8D, a flowchart depicting operation of a circuit for transmitter equalization using unit- and fractional-size subdrivers is shown, in accordance with one or more embodiments. FIG. 8D provides an exemplary detailed depiction of 854/858 from FIG. 8C. At 859, the level of de-emphasis provided by a fractional-sized subdriver in 854 may be provided by driving at an opposite polarity from the differential signal pair output. At 859, the level of de-emphasis provided by a unit-sized subdriver in 858 may be provided by driving at an opposite polarity from the differential signal pair output.

Turning now to FIG. 8E, a flowchart depicting operation of a circuit for transmitter equalization using unit- and fractional-size subdrivers is shown, in accordance with one or more embodiments. FIG. 8E provides an exemplary detailed depiction of 860 from FIG. 8A. At 865, an additional subdriver may be enabled in order to adjust/tune/alter the level of de-emphasis. In one embodiment, one or more unit-sized subdrivers may be enabled and/or one or more fractional-sized subdrivers may be enabled, similarly to 835 and/or 836 described above. At 867, the adjusted/tuned/altered level of de-emphasis provided by a fractional- and/or unit-sized subdriver may be provided by driving at an opposite polarity from the differential signal pair output. In one embodiment, driving at an opposite polarity may provide for an increased level of de-emphasis. At 859, the adjusted/tuned/altered level of de-emphasis provided by a fractional- and/or unit-sized subdriver may be provided by driving at the same polarity as the differential signal pair output. In one embodiment, driving at the same polarity may provide for a decreased level of de-emphasis. It is also contemplated that in accordance with some embodiments, a combination of fractional- and unit-sized subdrivers may be driven at opposite or the same polarities to provide for various levels of de-emphasis.

It is contemplated that the steps as shown in FIGS. 8A-8E are not limited to the order in which they are described above. In accordance with one or more embodiments, the steps shown in FIGS. 8A-8E may be performed sequentially, in parallel, or in alternate order(s) without departing from the spirit and scope of the embodiments presented herein.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 155 (including embedded RAMs), compact discs, DVDs, solid state storage and/or the like). In one embodiment, the GDSII data (or other similar data) may be adapted to configure a manufacturing facility (e.g., through the use of mask works) to create devices capable of embodying various aspects described herein, in the instant application. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing I/O interfaces 130, current-mode logic output drivers 310, output drivers 502, tap and equalization circuitry 515/515/516 and/or the like may be created using the GDSII data (or other similar data).

It should also be noted that while various embodiments may be described in terms of SATA standards and serial I/O interfaces, it is contemplated that the embodiments described herein may have a wide range of applicability, not just for serial interfaces, as would be apparent to one of skill in the art having the benefit of this disclosure.

The particular embodiments disclosed above are illustrative only, as the embodiments may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope of the claimed invention.

Accordingly, the protection sought herein is as set forth in the claims below.

What is claimed:

1. A method, comprising:
   enabling at least one subdriver of a plurality of subdrivers of an output driver circuit of a data transmission device, wherein the plurality of subdrivers comprises at least one fractional-sized subdriver;
   driving a differential signal pair output from the output driver circuit;
   providing a de-emphasis indication to the output driver circuit; and
   enabling at least one unit-sized subdriver, in response to the provided de-emphasis signal, to provide a level of de-emphasis to the differential signal pair output by driving the differential signal pair output using the at least one unit-sized subdriver.

2. The method of claim 1, wherein enabling the at least one subdriver of the plurality of subdrivers comprises enabling the least one fractional-sized subdriver.

3. The method of claim 2, wherein driving the differential signal pair output comprises driving using the at least one fractional-sized subdriver.

4. The method of claim 1, further comprising:
enabling the at least one fractional-sized subdriver, in response to the provided de-emphasis signal, to provide a level of de-emphasis to the differential signal pair output by driving the differential signal pair output using the at least one fractional-sized subdriver.

5. The method of claim 1, further comprising:
changing the level of de-emphasis by enabling at least one additional subdriver of the plurality of subdrivers and driving the differential signal pair output using the at least one additional subdriver.

6. The method of claim 1, wherein enabling the at least one subdriver of the plurality of subdrivers comprises enabling at least one unit-sized subdriver; and
wherein driving the differential signal pair output comprises driving using the at least one unit-sized subdriver.

7. The method of claim 1, wherein enabling the at least one subdriver of the plurality of subdrivers comprises enabling the at least one fractional-sized subdriver and enabling at least one unit-sized subdriver, and wherein driving the differential signal pair output comprises driving using the at least one fractional-sized subdriver and the at least one unit-sized subdriver, and further comprising:
providing a level of de-emphasis to the differential signal pair output using at least one of the at least one fractional-sized subdriver or the at least one unit-sized subdriver.

8. The method of claim 7, wherein providing a level of de-emphasis comprises driving the at least one fractional-sized subdriver or the at least one unit-sized subdriver at a polarity that is opposite from the differential signal pair output.

9. A device that comprises:
an output driver portion having a plurality of subdrivers, wherein at least one subdriver of the plurality of subdrivers is a fractional-sized subdriver;
a de-emphasis portion communicatively coupled to the data output driver portion, wherein the de-emphasis portion is configured to enable and disable a subset of the plurality of subdrivers, wherein the de-emphasis portion further comprises a signal generator portion configured to generate a plurality of tap signals; and a selector portion communicatively coupled to the signal generator portion, the selector portion being configured to select a level of de-emphasis for the output data signal driven by the output driver portion by selecting a portion of the tap signals,
a pre-driver portion communicatively coupled to the output driver portion;
a synchronizer portion communicatively coupled to the pre-driver portion and to the output driver portion, the synchronizer portion being configured to synchronize one or more signals from the de-emphasis portion with a device clock signal;
an operating voltage node; and
a ground voltage node;
wherein the device is configured to drive an output data signal.

10. The device of claim 9, wherein the plurality of subdrivers comprises a first and a second group of subdrivers; and
wherein the first group of subdrivers comprises a plurality of unit-sized subdrivers and wherein the second group of subdrivers comprises at least one fractional-sized subdriver.

11. The device of claim 10, wherein the plurality of subdrivers further comprises a third group of subdrivers that includes at least one fractional-sized subdriver.

12. The device of claim 10, wherein the first group of subdrivers is configured to drive the output data signal; and
wherein the second group of subdrivers is configured to provide a level of de-emphasis to the output data signal.

13. The device of claim 12, wherein the second group of subdrivers is configured to provide a level of de-emphasis by driving the output data signal at a polarity that is opposite of the polarity driven by the first group of subdrivers.

14. A non-transitory, computer readable storage device encoded with data that, when implemented in a manufacturing facility, adapts the manufacturing facility to create an apparatus, wherein the apparatus comprises:
an output driver portion having a plurality of subdrivers, wherein at least one subdriver of the plurality of subdrivers is a fractional-sized subdriver;
a de-emphasis portion communicatively coupled to the data output driver portion, wherein the de-emphasis portion is configured to enable and disable a subset of the plurality of subdrivers, wherein the de-emphasis portion further comprises a signal generator portion configured to generate a plurality of tap signals; and a selector portion communicatively coupled to the signal generator portion, the selector portion being configured to select a level of de-emphasis for the output data signal driven by the output driver portion by selecting a portion of the tap signals,
a pre-driver portion communicatively coupled to the output driver portion;
a synchronizer portion communicatively coupled to the pre-driver portion and to the output driver portion, the synchronizer portion being configured to synchronize one or more signals from the de-emphasis portion with a device clock signal;
an operating voltage node; and
a ground voltage node;
wherein the output driver portion is configured to drive an output data signal.

15. A non-transitory, computer readable storage device, as set forth in claim 14, encoded with data that, when implemented in a manufacturing facility, adapts the manufacturing facility to create an apparatus, wherein the plurality of subdrivers further comprises a third group of subdrivers that includes at least one fractional-sized subdriver.

16. A non-transitory, computer readable storage device, as set forth in claim 14, encoded with data that, when implemented in a manufacturing facility, adapts the manufacturing facility to create an apparatus, wherein the first group of subdrivers is configured to drive the output data signal; and
wherein the second group of subdrivers is configured to provide a level of de-emphasis to the output data signal by driving the output data signal at a polarity that is opposite of the polarity driven by the first group of subdrivers.

17. An apparatus, comprising:
an output driver portion having a plurality of subdrivers, wherein at least one subdriver of the plurality of subdrivers is a fractional-sized subdriver, the output driver portion being configured to drive a differential output data signal; and
a de-emphasis portion communicatively coupled to the data output driver portion, wherein the de-emphasis portion is configured to enable and disable a subset of the plurality of subdrivers and provide a de-emphasis indication to the output driver circuit and enable at least one unit-sized subdriver, in response to the provided de-emphasis indication, to provide a level of de-emphasis to the differential signal pair output by driving the differential signal pair output using the at least one unit-sized subdriver, wherein the subset of the plurality of subdrivers comprises at least one fractional-sized subdriver.

18. The apparatus of claim 17, wherein the output driver is configured to drive the differential output data signal using the at least one enabled fractional-sized subdriver.

19. The apparatus of claim 17, wherein the de-emphasis portion is further configured to:
  enable the at least one fractional-sized subdriver, in response to the provided de-emphasis indication, to provide a level of de-emphasis to the differential output data signal.

20. The apparatus of claim 17, wherein the de-emphasis portion is further configured to change the level of de-emphasis by enabling at least one additional subdriver of the plurality of subdrivers and drive the differential signal pair output using the at least one additional subdriver.

21. The apparatus of claim 17, wherein the plurality of subdrivers comprises at least one unit-sized subdriver, and wherein the output driver is configured to drive the differential output signal using the at least one unit-sized subdriver; and
  wherein the output driver is configured to provide a level of de-emphasis to the differential output data signal by driving the at least one fractional-sized subdriver or the at least one unit-sized subdriver at a polarity that is opposite from the at least one unit-sized subdriver.

22. The apparatus of claim 21, wherein the de-emphasis portion is configured to alter the de-emphasis indication to the output driver circuit by performing at least one of:
  enabling at least one additional fractional-sized subdriver or at least one additional unit-sized sub driver; or
  disabling at least one enabled subdriver; and
  wherein the output driver is configured to provide the altered level of de-emphasis to the differential output data signal.

* * * * *